United States Patent [19]
Yoon et al.

[11] Patent Number: 6,025,900
[45] Date of Patent: Feb. 15, 2000

[54] METHOD OF CONTROLLING PRETILT OF LIQUID CRYSTAL CELL

[75] Inventors: Ki Hyuk Yoon; Joung Won Woo, both of Seoul; Yoo Jin Choi; Mi Sook Nam, both of Kyungki-do; Jong Hyun Kim, Seoul, all of Rep. of Korea

[73] Assignee: LG Electronics Inc., Seoul, Rep. of Korea

[21] Appl. No.: 08/941,011

[22] Filed: Sep. 30, 1997

[30] Foreign Application Priority Data

Oct. 7, 1996 [KR] Rep. of Korea ................. 96-44455

[51] Int. Cl.$^7$ ................................................. C02F 1/1337
[52] U.S. Cl. ......................................... 349/124; 349/123
[58] Field of Search ......................................... 349/123

[56] References Cited

U.S. PATENT DOCUMENTS

| | | | |
|---|---|---|---|
| 4,619,500 | 10/1986 | Ahne et al. | 349/124 |
| 4,725,517 | 2/1988 | Nakanowatari et al. | 349/124 |
| 5,464,669 | 11/1995 | Kang et al. | 349/124 |
| 5,604,615 | 2/1997 | Iwagoe et al. | 349/124 |
| 5,626,995 | 5/1997 | Teruya et al. | 349/124 |
| 5,629,056 | 5/1997 | Koike et al. | 349/123 |
| 5,648,829 | 7/1997 | Yano | 349/129 |
| 5,767,994 | 6/1998 | Kang et al. | 349/123 |
| 5,786,041 | 7/1998 | Takenaka et al. | 349/123 |
| 5,882,238 | 3/1999 | Kim et al. | 349/135 |

OTHER PUBLICATIONS

Myrvold, Bernt O., et al., "Liquid Crystal Alignment on Polymer Films: Changes of the Pretilt Angles Due to the Thermal Treatment of Polyalkylene Pyromellitimidides," Japanese Journal of Applied Physics, vol. 32, No. 1993, pp. 5052–5058.

Lien et al., "UV modification of surface pretilte of alignment layers for multidomain liquid crystal displays", Appl. Phys. Lett., vol. 67, No. 21,, pp. 3108–3110, Nov. 1995.

Marusii et al., "Photosensitive Orientants for Liquid Crystal Alignment", Mol. Mat., 1993, vol. 3, pp. 161–168, 1993.

Hashimoto et al.; "41.4: TN–LC With Quartered Subpixels Using Polarized UV–Light–Irradiated Polymer Orientation Films", SID 95 Digest; pp. 877–880 (1995).

Schadt et al.; "Surface–Induced Parallel Alignment of Liquid Crystals by Linearly Polymerized Photopolymers", Jpn J. Appl. Phys. vol. 31, Part 1, No. 7, pp. 2155–2164 (1992).

*Primary Examiner*—William L. Sikes
*Assistant Examiner*—Dung Nguyen
*Attorney, Agent, or Firm*—Finnegan, Henderson, Farabow, Garrett & Dunner, L.L.P.

[57] ABSTRACT

A method of controlling the pretilt direction of the alignment layer in a liquid crystal cell including applying thermal energy to the alignment layer and exposing the alignment to light to control the pretilt direction of the alignment layer.

22 Claims, 5 Drawing Sheets

METHOD OF CONTROLLING PRETILT OF LIQUID CRYSTAL CELL

BACKGROUND OF THE INVENTION

A. Field of the Invention

The present invention relates to a method of making a liquid crystal cell, and more particularly to a method of controlling pretilt of the liquid crystal cell.

B. Description of the Prior Art

To manufacture liquid crystal display device having uniform brightness and a high contrast ratio, it is necessary to align the liquid crystal molecules within the liquid crystal layer in a certain direction. The most useful aligning method is the rubbing method. In the rubbing method, the alignment layer, a polyimide or polyamide-coated layer, is mechanically brushed with fabrics, etc., so that microgrooves are generated on the surface of the alignment layer.

The periodic topology of mechanically grooved LCD-substrates minimizes the elastic deformation energy of liquid crystals by forcing the director to align parallel to the microgrooves. In the rubbing method, however, the defect of the microgrooves causes random phase distortion and light scattering, deteriorating the image quality. Further, the brushing using rubbing cloth in the rubbing process generates dust and electrostatic discharge on the alignment layer causing damage to the substrate and resultant yield deterioration.

To solve the above substrate damage and yield deterioration problem, a photo-aligning method using ultraviolet light (UV light) has been introduced (T. Hashimoto et al. Digest SID 95 p.877–880). By Hashimoto method, the alignment layer, a polyvinylcinnamate (PVCN) based polymer, is exposed to UV light in the vertical and oblique directions with respect to the surface of the alignment layer to form the pretilt direction to the alignment layer. That is, as shown in FIG. 1A, only the y-axis chains of the polymer are dimerized and the other side chains in the x-z plane remain when the alignment layer 10 is vertically exposed with the UV light having a polarization direction parallel to the y-axis.

In FIGS. 1A and 1B, the dotted arrows indicate the direction of the polymer dimerizations and solid arrows indicate the direction of the remaining side chain in the x-z plane. By vertical exposure to UV light, the optical constants in the y-z plane are directed parallel to the z-axis while the optical constants in the x-z plane still exhibit anisotropy yet. When the alignment layer 10 is obliquely exposed with ultraviolet light having a polarization direction parallel to the x-z plane, as shown in FIG. 1C, the side chains parallel to the polarization direction are dimerized, so that only the side chains parallel to the irradiating direction remain.

The remaining side chains interact with the liquid crystal molecules to give the pretilt direction to the liquid crystal molecules. At that time, the pretilt angle that will determine the tilt angle between the surface of the alignment layer 10 and the liquid crystal molecules depends upon the irradiation angle of the UV light relative to the surface of the alignment layer. When the irradiation angle is 30°, 45°, 60°, for example, the pretilt angle is about 0.15°, 0.26°, 0.30°.

However, in Hashimoto method, since the alignment layer 10 is exposed with UV light twice, the process is complicated. Further, because the generated pretilt angle is very small, a desired pretilt angle having a large size cannot be obtained.

As used in this description and in the appended claims, the word 'pretilt direction' means both the alignment direction, which is the azimuthal direction of the LC molecules to be aligned on the surface of the alignment layer, and the pretilt angle between the liquid crystal molecules to be tilted and the surface of the alignment layer.

In this invention, polysiloxane based material or polyvinylfluorocinnamate (PVCN-F) is preferably used as an alignment layer. The structural formulas of the polysiloxanecinnamate and PVCN-F are indicated below. In these formulas, polysiloxanecinnamate I and II are examples of polysiloxane based materials. PVCN-F:

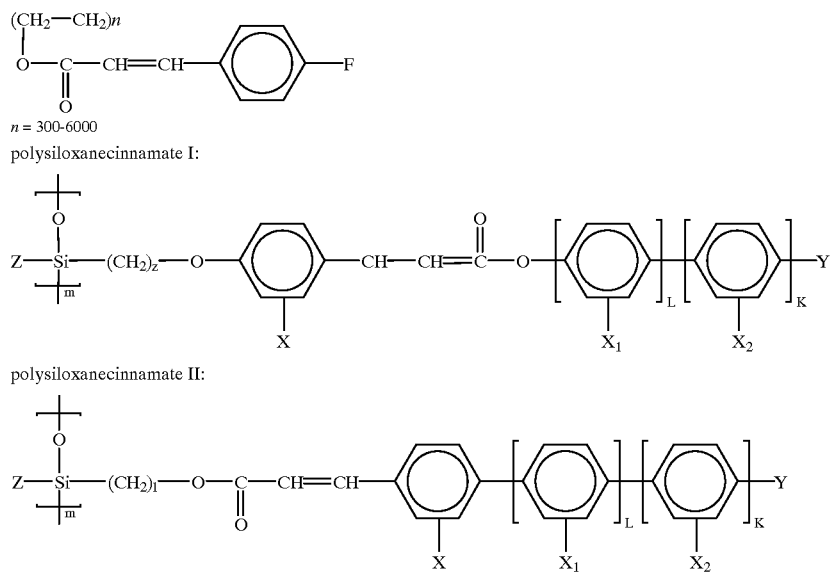

$Z = OH$, $CH_3$, or a mixture of OH and $CH_3$
$m = 10$–$100$
$l = 1$–$11$
$L = 0$ or $1$ K=0 or 1

X, $X_1$, $X_2$, Y=H, F, Cl, CN, $CF_3$, $C_nH_{2n+1}$ or $OC_nH_{2n+1}$ (n=1–10)

As shown in FIG. 2, the pretilt angle of the polysiloxane or PVCN-F alignment layer depends on the irradiation time or the density of the UV light, i.e., the amount of absorption energy of the UV light. The larger the absorption energy is, the smaller the pretilt angle. Accordingly, the direction of the alignment axis is determined by the polarization direction of the UV light, and the size of the pretilt angle is dependent upon the amount of UV absorption energy.

The size of the pretilt angle is very important to the capacity of the liquid crystal display device. In the case of a large pretilt angle, the liquid crystal molecules aligned along the pretilt direction have a high response speed so that a quick dynamic picture image can be achieved. In the case of a small pretilt angle, the dynamic picture image is slowly turned and then the quality of picture image is deteriorated. In addition, since the liquid crystal molecules sensitively respond to the low driving voltage in the case of the small pretilt angle, the consumption of energy decreases.

As shown in FIG. 2, the pretilt angle of the polysiloxane or PVCN-F alignment layer can be controlled in 0°–90°. However, since the gradient of the characteristic curve of the absorption energy, i.e., the irradiating time of the UV light and the pretilt angle in the region Δx is too steep, the size of the pretilt angle is abruptly varied according to the irradiating time in the region Δx. Accordingly, it is very difficult to precisely control the pretilt angle in this region. Practically, the pretilt angle (3°–5°) in the region except for the region Δx can be controlled.

As described above, since the pretilt angle of the polysiloxane based materials or PVCV-F is limited in 3°–5° larger than that of Hashimoto's method, it is impossible to obtain a pretilt angle having desired size. Further, because the pretilt angle varies abruptly according to the absorption energy, the pretilt angle cannot be precisely controlled.

SUMMARY OF THE INVENTION

An object of this invention is to provide a method of controlling the pretilt angle of the alignment layer correctly by controlling thermal energy absorbed in the alignment layer.

In order to achieve this object, according to an aspect of the present invention, a method, as embodied, and broadly defined herein, includes applying thermal energy to the alignment layer; and exposing the alignment layer to ultraviolet light to control the pretilt angle direction of the alignment layer.

The pretilt angle of polysiloxane based materials or PVCN-F alignment layer, for example, varies according to the thermal energy absorbed in the alignment layer. For constant ultraviolet light absorption energy and annealing temperature, the longer the annealing time is, the smaller the pretilt angle. For constant ultraviolet light absorption energy and annealing time, the higher the annealing temperature is, the smaller the pretilt angle. In the UV absorption energy-pretilt angle curve, the gradient of the curve depends upon the absorbed thermal energy.

For constant UV absorption energy and annealing time, the thicker the alignment layer, the larger the pretilt angle.

According to an embodiment of the present invention, to determine the pretilt direction, the annealed alignment layer is exposed to polarized UV light to form the two alignment directions perpendicular to the polarization direction and then exposed again with polarized or non-polarized UV light to select one of the two alignment directions. Further, the pretilt direction can be determined by a single exposure of the alignment layer with UV light and the injection of the liquid crystal causing a flowing effect on the surface of the alignment layer.

In addition, single oblique exposure of the alignment layer with polarized UV light causes the pretilt direction in the alignment layer.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

DETAILED DESCRIPTION OF THE INVENTION

Reference will now be made in detail to the present preferred embodiment of the invention, an example of which is illustrated in the accompanying drawings. Wherever possible, the same reference numbers will be used throughout the drawings to refer to the same or like parts.

Figure 1A:
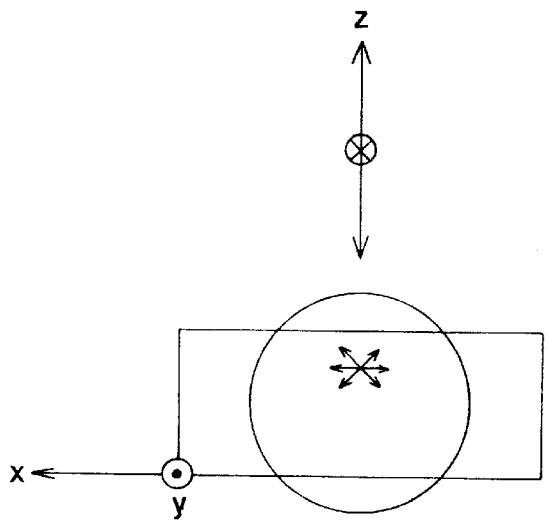
FIGS. 1A, 1B and 1C are drawings showing a conventional photo-aligning method.
Figure 1B:
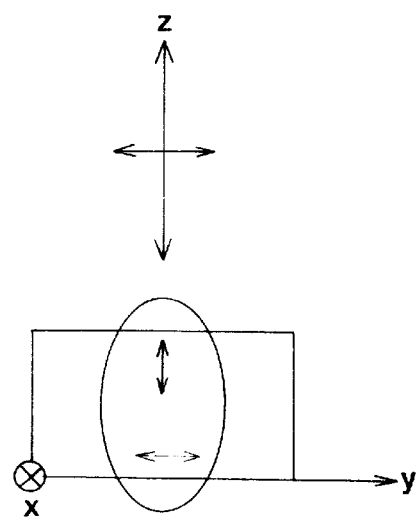
Figure 1C:
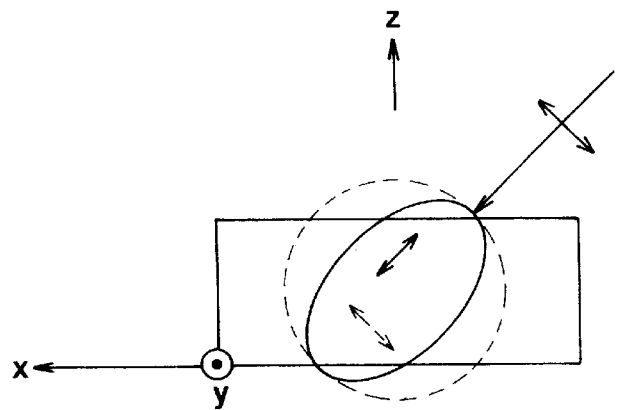
Figure 2:
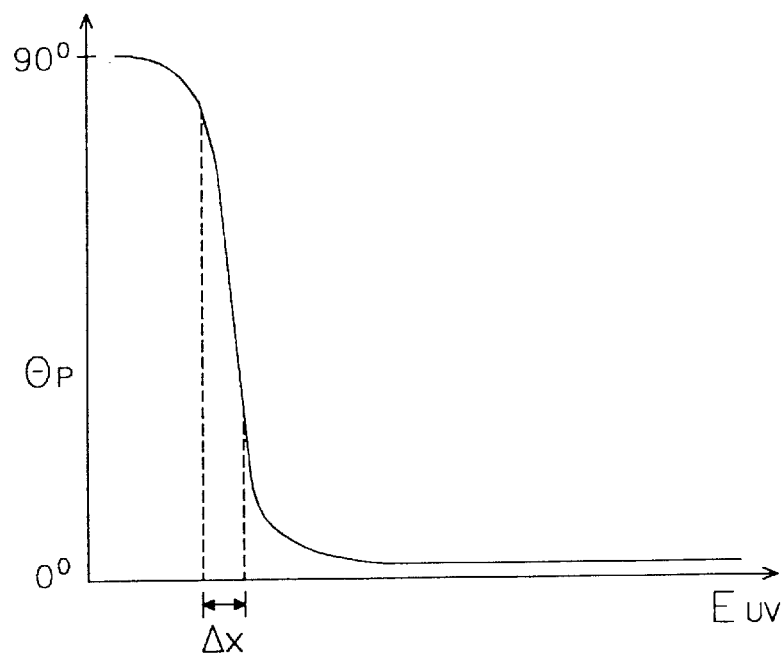
FIG. 2 is a drawing showing the UV absorption energy-pretilt angle curve of a conventional liquid crystal cell.
Figure 3:
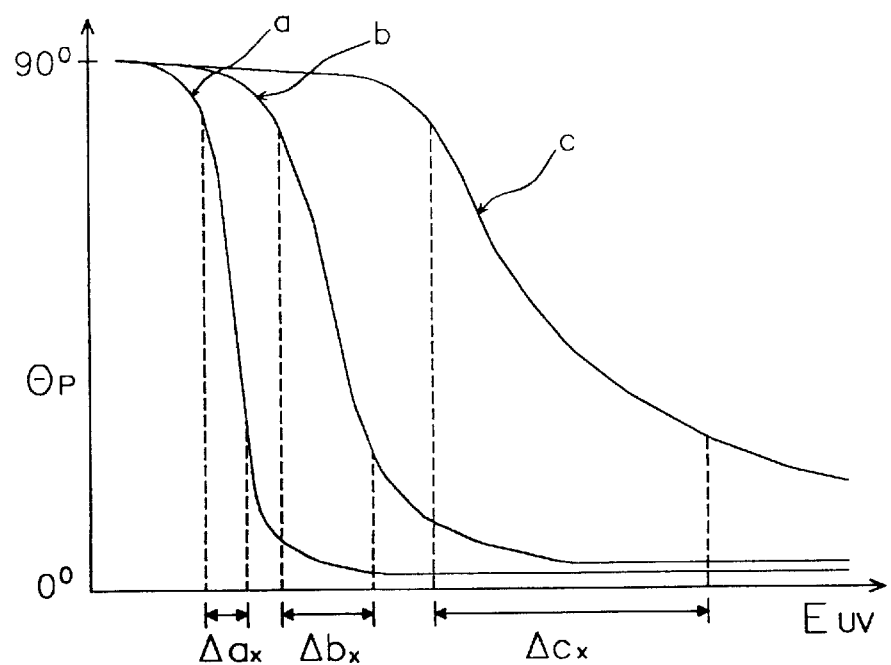
FIG. 3 is a drawing showing the UV absorption energy-pretilt angle curve of a liquid crystal cell according to an embodiment of the present invention.

In order to determine the pretilt direction of the alignment layer, the polysiloxane based materials or PVCN-F alignment layer coated on the substrate must be annealed for a certain period before the alignment layer is exposed with UV light. The relationship between the UV absorption energy Euv and the pretilt angle θp for each annealing time is shown in FIG.3. In this figure, the curves a, b, c are characteristic curves when the alignment layer is annealed at a temperature of about 180°–220° for 5, 4, and 3 hours, respectively. Further, the regions $\Delta a_x, \Delta b_x$, and $\Delta c_x$ are the amount of UV absorption energy necessary to vary the size of the pretilt angle θp for the respective curves a, b, c.

As shown, the smaller the annealing time of the alignment layer, the larger the region of UV light for varying the size of the pretilt angle θp($\Delta a_x < \Delta b_x < \Delta c_x$) will be. That is, as the annealing time increases, the curves become steeper. By controlling the UV absorption energy, i.e., the exposure time, the pretilt angle θp (within the above regions) is much larger than that of the conventional art can be obtained and correct control of the pretilt angle θp is possible.

Figure 4:
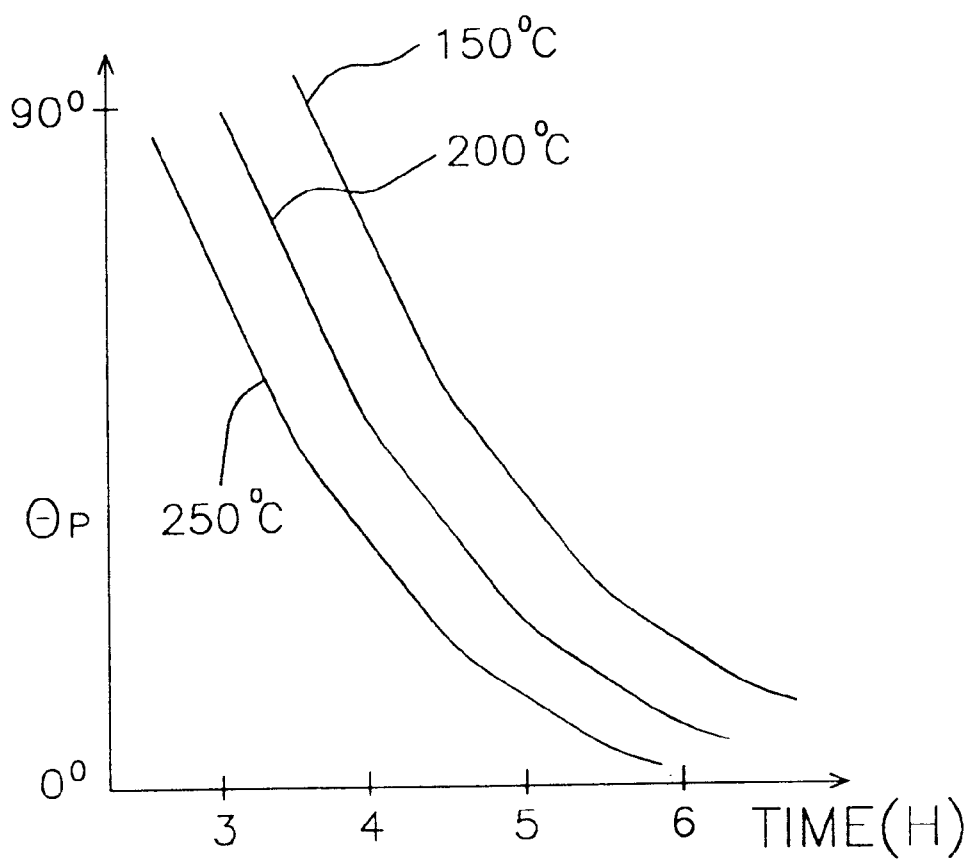
FIG. 4 is a drawing showing the annealing time-pretilt angle curve of the liquid crystal cell according to the embodiment of the present invention.

FIG. 4 is the annealing time H-pretilt angle curves for constant UV absorption energy. The respective curves indicates the characteristic curves at temperatures of about 150° C., 200° C., and 250° C. These curves are plotted based on the measurement after annealing and exposure of alignment layer. For constant UV absorption energy Euv and annealing temperature, as shown in FIG. 4, the longer the annealing time H, the smaller the pretilt angle p will be. For constant UV absorption energy Euv and annealing time H, the higher the annealing temperature, the smaller the pretilt angle θp will be. Thus, the larger the thermal energy absorbed to the alignment is, the smaller the preilt angle θp.

Figure 5:
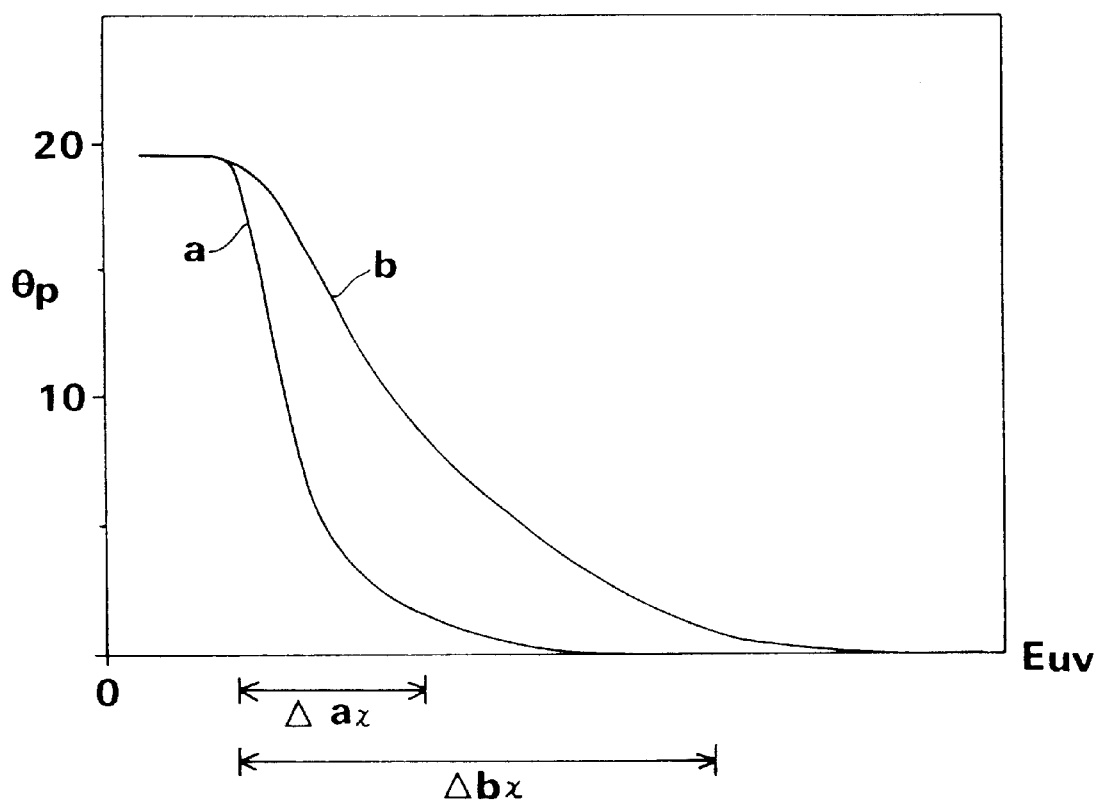
FIG. 5 is a drawing showing the UV absorption energy-pretilt angle curve depending on the thickness of the alignment layer of the liquid crystal cell according to the embodiment of the present invention.

Referring to FIG. 5, the pretilt angle θp depends upon the thickness of the polysiloxane based materials or PVCN-F alignment layer. That is, the thicker the alignment layer, the larger the pretilt angle θp will be. In this figure, the horizontal and vertical axes indicate the UV absorption energy Euv and the pretilt angle θp, respectively. The curves a and b are the characteristic curves of an alignment layer having a thickness of 40Å and 800Å for constant annealing time, respectively. According to the increase of the thickness of the alignment layer, as shown in the figure, since the size of the pretilt angle θp, as well as the region of UV light for varying the size of the pretilt angle θp becomes large, the size of the pretilt angle θp can correctly be controlled by increasing the thickness of the alignment layer.

The annealed alignment layer is vertically exposed with polarized UV light to determine two symmetric pretilt directions, the alignment direction and the pretilt angle, relative to the normal line of the surface of the alignment layer. The annealed alignment layer is then obliquely exposed with non-polarized UV light to select one of the symmetric pretilt direction. At that time, the selected direction is parallel to the irradiating direction of the second UV light.

The annealed alignment layer can be obliquely exposed with non-polarized UV light, followed by vertical exposure with polarized UV light to determine the pretilt direction. Further, the pretilt direction can be determined y the first oblique exposure of the annealed alignment layer with non-polarized UV light and second oblique exposure with polarized UV light. At that time, it is possible to obliquely expose the alignment layer with the non-polarized UV light, followed by the oblique exposure with the polarized UV light.

Another method of forming the pretilt direction is using the flowing effect of the liquid crystal. When the annealed alignment layer is vertically exposed with polarized UV light, the two symmetric pretilt directions are determined relative to the normal direction of the surface of the alignment layer. Subsequently, one pretilt direction of two symmetric pretilt directions in the flowing direction of the liquid crystal is selected by the flowing effect when the liquid crystal is injected between the alignment layers of the substrates. At that time, also, the size of the pretilt angle Op depends upon the thermal absorption energy and the UV absorption energy.

Figure 6:
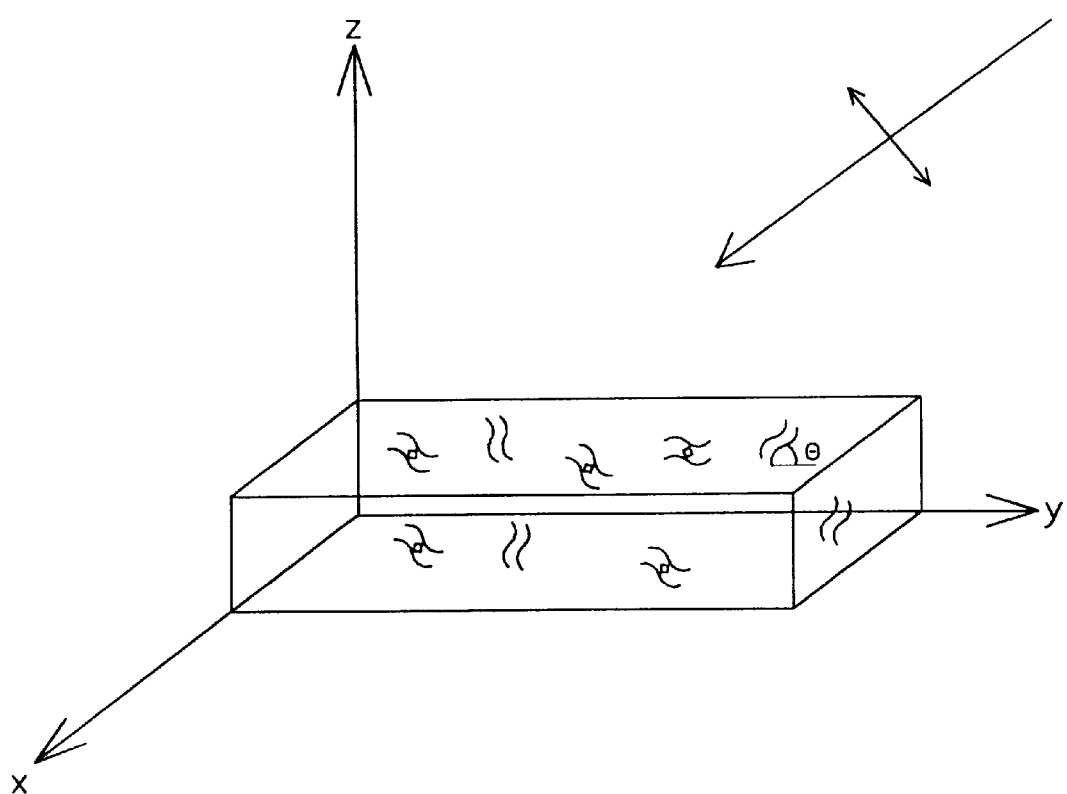
FIG. 6 is a drawing showing the photo-aligning method according to the embodiment of the present invention.

In addition, the pretilt direction can be determined by a single exposure with polarized UV light. The annealed alignment layer 10 is obliquely exposed with polarized UV light, as shown in FIG. 6. In exposing the alignment layer with UV light, the side chains of the polymer parallel to the polarization direction of the UV light are dimerized (indicated as ∫◇∫ in FIG. 6), So that only the side chains (indicated as ∫∫ in FIG. 6) approximately parallel to the irradiating direction of the UV light remain. Thus, the liquid crystal molecules interact with the side chains of the polymer to align the liquid crystal molecules in a direction parallel to the irradiating direction. At that time, θ is the angle of the side chains of the polymer relative to the surface of the alignment layer 10. This angle becomes the tilt angle between the liquid crystal molecules and the alignment layer 10 after interaction between the molecules of the alignment layer 10.

In the above described invention, since the size of the pretilt angle depends upon the thermal energy absorbed by the alignment layer, the pretilt angle of desired size can correctly be controlled for the photo-aligning process. Thus, the quality of the image is increased. In addition, since a large pretilt angle is obtained by controlling the thermal absorption energy and the thickness of the alignment, the responding speed of the liquid crystal molecules causing the decrease in the consumption energy is increased.

Other embodiments of the invention will be apparent to those skilled in art from consideration of the specification and practice of the invention disclosed herein. It is intended that the specification and examples be considered as exemplary only, with a true scope and spirit of the invention being indicated by the following claims.

What is claimed is:

1. A method of controlling a pretilt direction of an alignment layer for use in a liquid crystal cell, comprising:
providing an alignment layer having a thickness on a substrate;
baking the alignment layer as applying thermal energy, wherein the applying of the thermal energy includes annealing the alignment layer for a predetermined time duration at a predetermined temperature; and
exposing the alignment layer to light to control the pretilt direction of the alignment layer, wherein the magnitude of tilt of the pretilt direction of the alignment layer is related to the amount of the thermal energy for baking to the alignment layer and the thickness of the alignment layer.

2. The method according to claim 1, wherein the light includes ultraviolet light.

3. The method according to claim 1, wherein the alignment layer includes photo-sensitive materials.

4. The method according to claim 3, wherein the photo-sensitive materials include a material selected from a group consisting of polyvinylfluorocinnamate and polysiloxane based materials.

5. The method according to claim 1, wherein said exposing the alignment layer includes exposing the alignment layer to polarized light vertically with respect to the alignment layer; and then exposing the alignment layer to non-polarized light obliquely with respect to the alignment layer.

6. The method according to claim 1, wherein said exposing the alignment layer includes exposing the alignment layer to non-polarized light vertically with respect to the alignment layer; and then exposing the alignment layer to polarized light obliquely with respect to the alignment layer.

7. The method according to claim 1, wherein said exposing the alignment layer includes exposing the alignment layer to polarized light obliquely with respect to the alignment layer; and then exposing the alignment layer to non-polarized light vertically with respect to the alignment layer.

8. The method according to claim 1, wherein said exposing the alignment layer includes exposing the alignment layer to non-polarized light obliquely with respect to the alignment layer; and then exposing the alignment layer to polarized light vertically with respect to the alignment layer.

9. The method according to claim 1, wherein said exposing the alignment layer includes exposing the alignment layer to polarized light obliquely with respect to the alignment layer.

10. A method of controlling a pretilt direction of an alignment layer for use in a liquid crystal cell, comprising:

providing an alignment layer on a substrate;

baking the alignment layer as applying thermal energy; and exposing the alignment layer to light to control the pretilt direction of the alignment layer, wherein the magnitude of tilt of the pretilt direction of the alignment layer is related to the amount of energy of the light absorbed into the alignment layer and the thickness of the alignment layer.

11. The method according to claim 10, wherein said exposing the alignment layer includes exposing the alignment layer to polarized light vertically with respect to the alignment layer; and then exposing the alignment layer to non-polarized light obliquely with respect to the alignment layer.

12. The method according to claim 10, wherein said exposing the alignment layer includes exposing the alignment layer to non-polarized light vertically with respect to the alignment layer; and then exposing the alignment layer to polarized light obliquely with respect to the alignment layer.

13. The method according to claim 10, wherein said exposing the alignment layer includes exposing the alignment layer to polarized light obliquely with respect to the alignment layer; and then exposing the alignment layer to non-polarized light vertically with respect to the alignment layer.

14. The method according to claim 10, wherein said exposing the alignment layer includes exposing the alignment layer to non-polarized light obliquely with respect to the alignment layer; and then exposing the alignment layer to polarized light vertically with respect to the alignment layer.

15. The method according to claim 10, wherein said exposing the alignment layer includes exposing the alignment layer to polarized light obliquely with respect to the alignment layer.

16. A method of controlling a pretilt direction of an alignment layer for use in a liquid crystal cell, comprising:

providing an alignment layer having a thickness on a substrate;

baking the alignment layer as applying thermal energy, wherein the applying of the thermal energy includes annealing the alignment layer for a predetermined time duration at a predetermined temperature;

exposing the alignment layer to light to provide two pretilt directions, wherein the magnitude of tilt of the pretilt direction of the alignment layer is related to the amount of the thermal energy for baking the alignment layer and the thickness of the alignment layer; and introducing liquid crystal over a surface of the alignment layer for providing a flowing effect to the surface of the alignment layer, said flowing effect selectively determining one of said two pretilt directions.

17. The method according to claim 16, wherein the light includes ultraviolet light.

18. The method according to claim 16, wherein the alignment layer includes photo-sensitive materials.

19. The method according to claim 18, wherein the photo-sensitive materials includes a material selected from a group consisting of polyvinylfluorocinnamate and polysiloxane based materials.

20. The method according to claim 16, wherein said exposing the alignment layer to light includes exposing the alignment layer to polarized light vertically with respect to the alignment layer.

21. A method of controlling a pretilt direction of an alignment layer for use in a liquid crystal cell, comprising:

providing an alignment layer on a substrate;

baking the alignment layer as applying thermal energy;

exposing the alignment layer to light to provide two pretilt directions, wherein the magnitude of tilt of the pretilt direction of the alignment layer is related to the amount of energy of the light absorbed into the alignment layer and the thickness of the alignment layer; and introducing liquid crystal over a surface of the alignment layer for providing a flowing effect to the surface of the alignment layer, said flowing effect selectively determining one of said two pretilt directions.

22. The method according to claim 21, wherein said exposing the alignment layer to light includes exposing the alignment layer to polarized light vertically with respect to the alignment layer.

\* \* \* \* \*